United States Patent
Kashyap

(10) Patent No.: US 9,208,197 B2
(45) Date of Patent: Dec. 8, 2015

(54) DYNAMIC SMT IN PARALLEL DATABASE SYSTEMS

(75) Inventor: Sujatha Kashyap, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 327 days.

(21) Appl. No.: 13/278,943

(22) Filed: Oct. 21, 2011

(65) Prior Publication Data

US 2013/0103670 A1   Apr. 25, 2013

(51) Int. Cl.
*G06F 17/30* (2006.01)
*G06F 9/38* (2006.01)

(52) U.S. Cl.
CPC ........ *G06F 17/30445* (2013.01); *G06F 9/3885* (2013.01)

(58) Field of Classification Search
CPC .......................... G06F 17/30445; G06F 9/3885
USPC .......................................................... 707/713
See application file for complete search history.

(56) References Cited

U.S. PATENT DOCUMENTS

| | | | |
|---|---|---|---|
| 6,658,447 B2 | 12/2003 | Cota-Robles | |
| 6,910,032 B2 | 6/2005 | Carlson et al. | |
| 7,155,600 B2 | 12/2006 | Burky et al. | |
| 7,447,710 B2 | 11/2008 | Sampath et al. | |
| 7,574,424 B2 | 8/2009 | Chowdhuri | |
| 7,669,204 B2 | 2/2010 | Moilanen | |
| 7,930,432 B2 | 4/2011 | Blaszczak | |
| 2006/0080285 A1* | 4/2006 | Chowdhuri | 707/3 |
| 2006/0218123 A1 | 9/2006 | Chowdhuri et al. | |
| 2007/0250470 A1 | 10/2007 | Duffy et al. | |
| 2007/0300227 A1 | 12/2007 | Mall et al. | |
| 2009/0132488 A1* | 5/2009 | Wehrmeister et al. | 707/3 |
| 2009/0254916 A1* | 10/2009 | Bose et al. | 718/104 |
| 2009/0328055 A1* | 12/2009 | Bose et al. | 718/105 |
| 2010/0312762 A1 | 12/2010 | Yan et al. | |
| 2011/0093638 A1 | 4/2011 | Divirgilio et al. | |

* cited by examiner

*Primary Examiner* — Grace Park
(74) *Attorney, Agent, or Firm* — DeLizio Law, PLLC

(57) ABSTRACT

A data management system receives a query. A query optimizer determines an access plan for the query. The access plan has a plurality of stages, where each stage may have a different degree of parallelism for processing threads executing the stage. The query optimizer determines a maximum degree of parallelism for the plurality of stages and reserves processor cores based on the maximum degree of parallelism. The data management system schedules threads on the reserved processor cores for a first stage of the access plan. The data management system changes simultaneous multi-threading (SMT) mode for the processor cores when a second stage of the access plan having a different degree of parallelism is executed.

21 Claims, 4 Drawing Sheets

DYNAMIC SMT IN PARALLEL DATABASE SYSTEMS

BACKGROUND

Embodiments of the inventive subject matter generally relate to the field of databases, and, more particularly, to dynamically adjusting SMT (Simultaneous Multi-Threading) modes in parallel database systems.

Many applications access one or more databases as part of their operation. In general, database management systems are designed to provide a quick response to requests to store or retrieve information. For example, most databases allow for parallelization of query execution, especially for applications that require access to large amounts of data. Generally speaking, parallelism can be achieved using pipelined parallelism or partitioned parallelism. In pipelined parallelism, the output of one operation is streamed into the input of the subsequent operation, so the two operations can achieve some degree of overlap (parallelism). In partitioned parallelism, the input data is partitioned among multiple processors, so an operation can be split into parallel independent operators, each working on a part of the data. However, the benefits of pipelined parallelism often cannot be fully realized in conventional systems. For example, the benefits of pipelined parallelism can be limited because relational pipelines are rarely very long—a chain of length ten is unusual. Further, some relational operators do not emit their first output until they have consumed all their inputs. Aggregate and sort operators have this property. As a result, such operators cannot be pipelined. Still further, it is often the case that the execution cost of one operator is much greater than the others (this is an example of skew). In such cases, the performance improvement obtained by pipelining can be very limited.

Partitioned parallelism provides further opportunities to execute queries in parallel. In partitioned parallelism, the query is partitioned into units of work that may be worked on by multiple processors in parallel. However, current implementations fail to account for the variance in parallelism at different stages of query execution. Query execution speed suffers because a stage can complete only when the slowest thread for a query stage is completed.

SUMMARY

A data management system receives a query. A query optimizer determines an access plan for the query. The access plan has a plurality of stages, where each stage may have a different degree of parallelism for processing threads executing the stage. The query optimizer determines a maximum degree of parallelism for the plurality of stages and reserves processor cores based on the maximum degree of parallelism. The data management system schedules threads on the reserved processor cores for a first stage of the access plan. The data management system changes a simultaneous multi-threading (SMT) mode for the processor cores when a second stage of the access plan having a different degree of parallelism is executed.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In general, the embodiments dynamically adjust a multi-threading mode of processors or processor cores executing queries in a data management system. Unlike previous systems, the multi-threading mode is changed during the query to reflect the current parallelism parameters for a stage of an access plan for the query.

Figure 1:
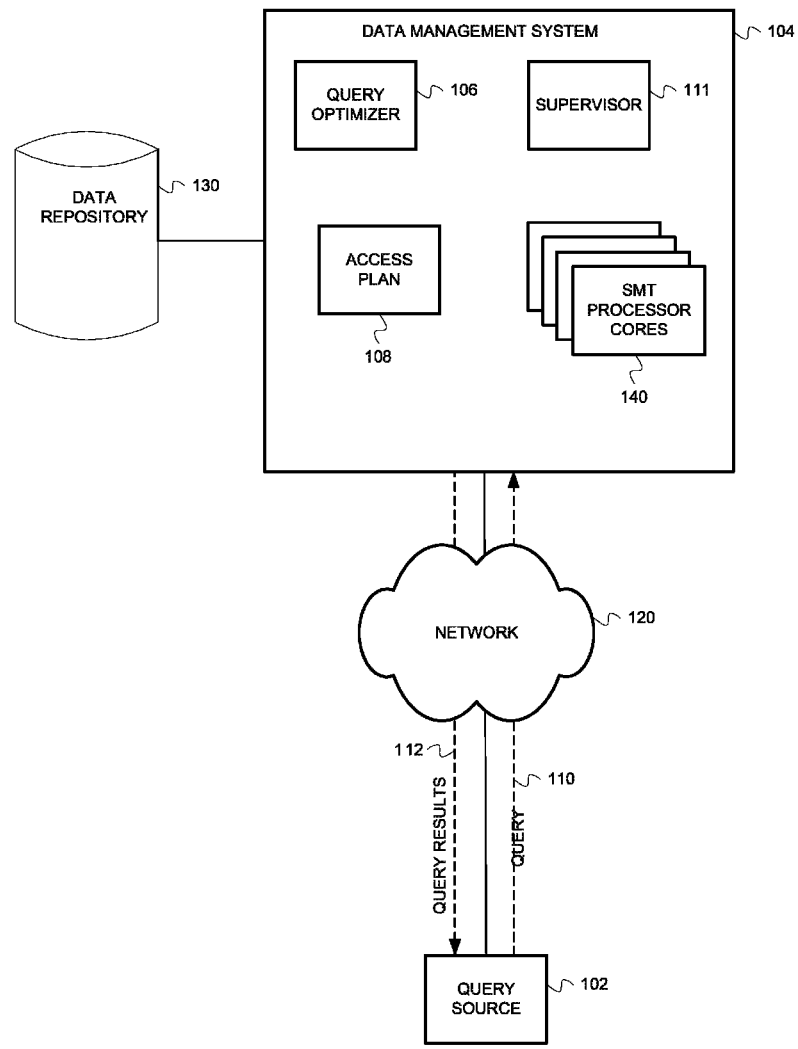
FIG. 1 depicts an example database management system that dynamically adjusts SMT modes.

FIG. 1 depicts an example system 100 that dynamically adjusts SMT modes during query execution. In some embodiments, system 100 includes a data management system 104 and a query source 102. Data management system 104 and query source 102 may be communicably coupled through network 120. Network 120 may be any type of communications network or collection of networks, including local area networks, wide area networks and the Internet.

Data management system 104 manages one or more data repositories 130. Data management system 104 responds to requests to create, read, update or delete data in a repository 130. In some embodiments, data management system may be a relational database system. In alternative embodiments, data management system 104 may be a hierarchical database or an object oriented database. The inventive subject matter is not limited to any particular type of database. Although one data repository is illustrated in FIG. 1, data management system 104 may access more than one repository 130. Further, repositories may be distributed across multiple systems or servers.

Query source 102 is any application or service that is a source of one or more queries 110 to create, read, update or delete data in data repository 130. Upon receiving a query 110 from query source 102, a query optimizer 106 of data management system 104 creates an access plan 108 for the query. An access plan 108 specifies a sequence of operations that are performed by the data management system to complete the query. The operations may include disk reads, summations, joins, index accesses and other operations that are executed in order to provide a result of the query. The operations in an access plan may be performed by processes or threads managed by the data management system. Portions of the access plan may be capable of being executed in parallel. For example, the processes or threads within the data management system may perform disk reads that access different portions of the data scanned as part of the query in parallel. The access plan is then executed by the data management system 104 and the results 112 returned to the query source 102.

Data management system 104 may execute on multiple processors or processor cores in order for the processing threads to execute in parallel. In some embodiments, data management system 104 executes on multiple SMT proces-"

sor cores. In SMT a single processor core can concurrently execute instruction streams for multiple threads by allowing multiple instruction streams to occupy various stages of the instruction pipeline. If a pipeline stage is not being used by one thread's instructions, the pipeline stage is available for use by another thread's instruction stream. Conversely, if multiple threads' instructions want to use the same pipeline stage, only one thread can use it in a cycle, the other thread's instruction(s) are momentarily delayed. SMT may also be referred to as hyperthreading.

In some embodiments, the processor cores may be POWER7 processors available from International Business Machines Corporation of Armonk, N.Y. The processors in these embodiments have three modes for executing threads: SMT-4, SMT-2 and ST modes. The modes indicate the number of threads that may be simultaneously executing on a core. For example, in SMT-4 mode, a maximum of four threads may occupy pipeline stages of a processor core. In SMT-2 mode, a maximum of two threads may occupy the pipeline stages of a processor core. In ST mode, a single thread is allowed to occupy the pipeline stages of a processor core Each processor core can switch between SMT-4, SMT-2, and ST modes—that is, a core can either run as 4 SMT-4 threads, 2 faster SMT-2 threads, or one fastest ST thread. The switch between SMT-4, SMT-2 or ST modes can be initiated by data management system 104. Those of skill in the art will appreciate that other types of processors may provide for different modes with different maximum numbers of threads.

Data management system 104 may optionally include a supervisor 110. In some embodiments, supervisor 110 monitors the execution of an access plan to determine the degree of parallelism usable by a currently executing stage of the access plan. Supervisor 110 may dynamically adjust SMT modes based on the degree of parallelism for a stage of an access plan.

Further details on the dynamic adjustment of SMT modes during the operation of system 100 are provided below with reference to FIG. 3.

Figure 2:
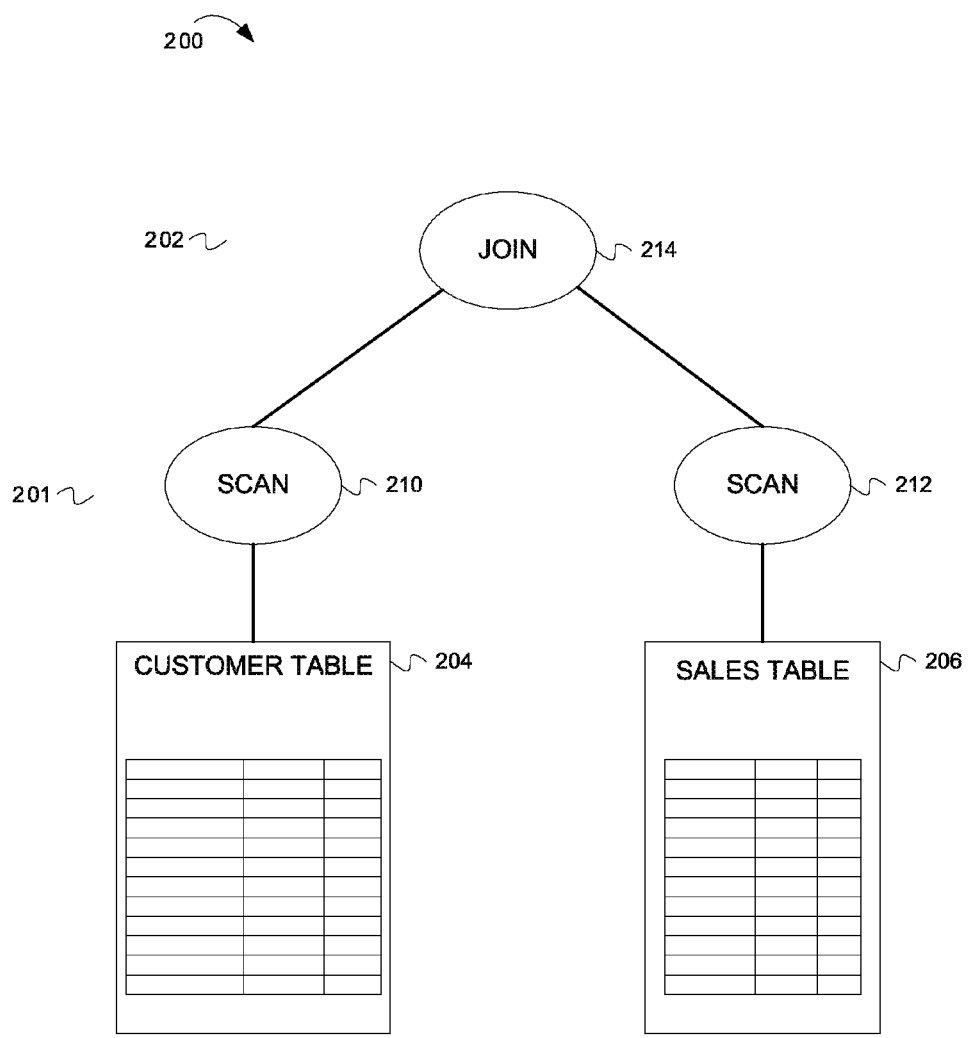
FIG. 2 is a graphical depiction of an example data flow for a query access plan having two stages.

FIG. 2 is a graphical depiction 200 of data flow in an example query access plan. FIG. 2 will be discussed in the context of an example database having two tables, a Customer table 204 and a Sales table 206. Consider the example query:

SELECT <columns> FROM Customers c, Sales s
WHERE s.cust_id=c.cust_id

The example query retrieves a results set comprising data from customer table 204 and sales table 206 where a customer identifier column (cust_id) in each of the two tables matches. An access plan for a query may have multiple stages, where a stage is a group of operations that can be executed in parallel with one another. In the example illustrated in FIG. 2, two stages are shown for the example query, a scanning stage 201 and a join stage 202. During the scanning stage 201, scan operation 210 reads relevant data from customer table 204 and scan operation 212 reads relevant data from sales table 206. Scan operations 210 and 212 can be executed in parallel.

Additionally, each scan operation 210 and 212 can be further parallelized by having multiple processes or threads each read in a portion of the data from the customer table 204 and sales table 206. As an example, data management system 104 can partition each table into 16 segments, resulting in a total of 32 parallel scan processes or threads, each reading 1/16th of their respective table. Those of skill in the art having the benefit of the disclosure will appreciate that the tables could be partitioned into more or fewer segments, resulting in a different number of parallel scan processes or threads.

During join stage 202, join operation 214 merges the results from the scan operations 210 and 212 for the two tables. Because data from both tables must be accessed simultaneously, join operation 214 can only employ half the degree of parallelism of scan operations 210 and 212. Assuming that the join operation 214 is parallelized across 16 processes, the system utilizes another level of the join operation that merges the results of these parallel joins, due to the need to eliminate duplicate tuples.

The above example shows that the achievable degree of parallelism varies depending on which stage of an access plan is currently being executed.

Previous systems typically treat each operation as a logical unit of work, executed by a different process or thread. Thus, each of the 32 scan processes or threads and 16 join processes or threads are treated as independent threads of execution that can be scheduled on any processor in the system. In the case of homogeneous multiprocessor environments, each of the 16 join processes execute at the same speed as each of the 32 scan processes (assuming there are at least 32 hardware execution threads available). In heterogeneous processor environments, previous systems assume that a few faster processors exist, so some critical threads (such as a final aggregate join) can be scheduled to execute on the fastest cores, while the 32 scan and 16 join processes execute on the more numerous, slower cores. Even when SMT-enabled systems are considered, previous systems assume that some of the SMT processors are statically set to execute with fewer threads (such as, in a single-thread mode), to serve the purpose of the few faster cores. Note that executing a strict subset of the parallel processes (for example, 4 of the join processes) on faster cores does not result in faster overall execution time, because the operation only completes when the slowest thread completes.

In contrast to traditional systems, the systems and methods of the inventive subject matter dynamically (i.e., at runtime) adjust SMT modes on SMT processors such that the system can rapidly switch between having multiple threads of execution to a having fewer, more powerful threads of execution. The systems and methods dynamically adjust parameters on SMT processors to customize the degree of parallelism used at each stage of an access plan, by providing higher single-thread performance for "merge" operations, and a higher degree of parallelism for parallel operations.

Figure 3:
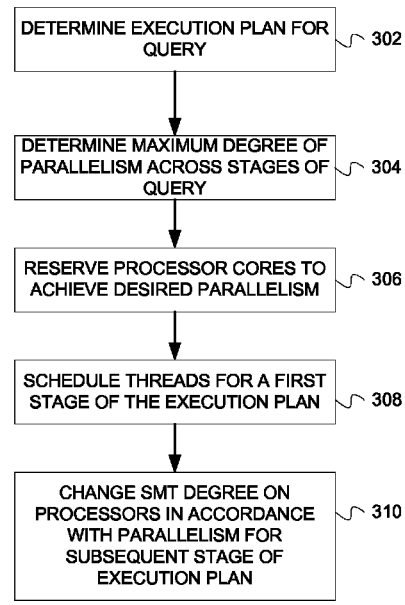
FIG. 3 is a flowchart depicting an example method for dynamically adjusting SMT modes during the execution of a database query.

FIG. 3 is a flowchart depicting an example method 300 for dynamically adjusting SMT modes during the execution of a database query. Method 300 begins at block 302 where a query optimizer 106 in a data management system 104 creates an access plan in response to receiving a query. The access plan may have multiple stages of operations, where each stage comprises operations that may take place in parallel with one another. As noted above, such operations may include disk reads (scans), summations, joins, index accesses and other operations that are executed in order to provide a result of the query.

At block 304, the query optimizer 106 determines a maximum degree of parallelism across the stages of the access plan. The maximum degree of parallelism is the highest degree of parallelism used by any one stage of the access plan. The access plan may have varying degrees of parallelism such that some of the operations are completed by threads that execute in parallel with one another. The maximum degree of parallelism may be constrained by the number of processors or processor cores in a system, the number of simultaneous threads supported by each processor core, and other resource constraints. Further, the maximum degree of parallelism may depend on the number of tables referenced in the query and other operations specified by the query.

At block 306, data management system 104 reserves processor cores to be allocated for execution of the access plan based on the maximum degree of parallelism for the query. In some embodiments, the number of cores reserved for an access plan may depend on the maximum SMT mode of the processor cores. For example, if the maximum degree of parallelism is 32, and the maximum SMT mode of the processor cores in the system is 4 (e.g., SMT-4 mode), then the system may reserve 8 processor cores for the access plan.

At block 308, data management system 104 schedules the threads for a first stage of the access plan on some or all of the processor cores reserved at block 306. The SMT mode is set for the processor cores based on the degree of parallelism usable by the first stage.

At block 310, the data management system changes the SMT mode of the reserved processor cores based on a current degree of parallelism for a subsequent stage of the access plan. The current degree of parallelism may be determined in any of a variety of ways. For example, in some embodiments, the degree of parallelism for a stage is determined by the query optimizer and comprises part of the data provided by the query optimizer when the access plan is created. The degree of parallelism may be a numeric value provided in the access plan or it may be encoded as a rule or formula in the access plan. In alternative embodiments, the current degree of parallelism may be determined at runtime when the access plan is executed. The data management system may determine the degree of parallelism for a stage of the access plan by analyzing the operations defined for the stage. Alternatively, a supervisor process may monitor execution of the access plan and analyze the current degree of parallelism for the currently executing stage of the access plan. The SMT mode is set according to the degree of parallelism for the stage.

Applying the above-described method to the example provided in FIG. 2, the example query could execute as follows assuming 8 processor cores are available. At scanning stage 201, each of the 8 processor cores would execute in SMT-4 mode, allowing all 32 processes to run in parallel. For the parallel join stage 202, block 308 of method 300 switches the 8 processor cores to SMT-2 mode, thereby creating 16 faster threads on which the 16 parallel processes of join stage 202 would execute. A final aggregate join could be performed on one core which would be put into ST (Single Thread) mode, providing the fastest performance for the aggregate join.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
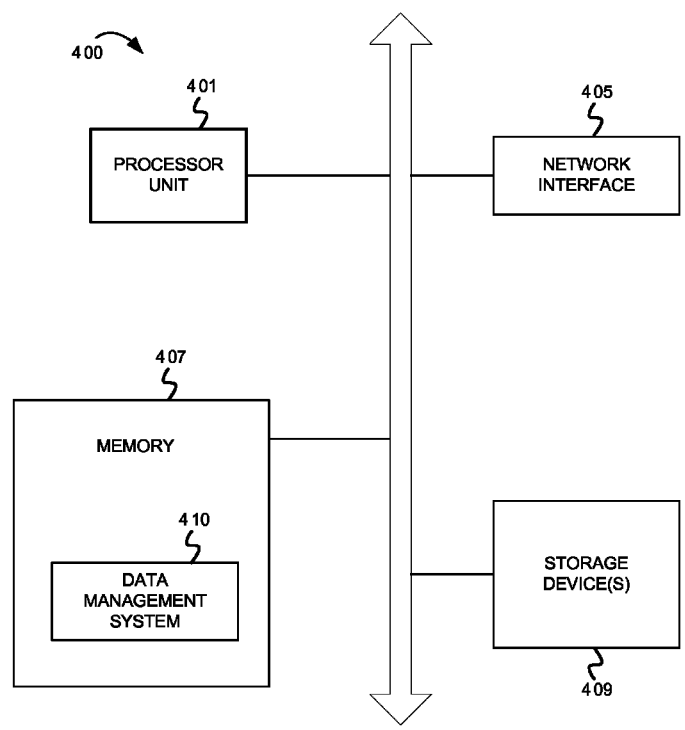
FIG. 4 depicts components of an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 includes a data management system 410 that includes functionality to implement embodiments described above. The system memory 407 may include some or all of the data management system and query optimizer functions described above. Alternatively, the functions of the data management system 410 or query optimizer described above may be distributed across multiple systems and system memories and may be loaded from one or more computer-readable media. Further, the data management system and query optimizer may be implemented with code embodied in co-processors, or on other hardware components such as cards, etc. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for executing queries in accordance with a deadline as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining an access plan for a query, the access plan having a plurality of stages;
    determining a maximum degree of parallelism for the plurality of stages, wherein the maximum degree of parallelism is the highest degree of parallelism used by any one stage of the access plan;
    reserving processor cores from a set of processor cores in accordance with the maximum degree of parallelism and a maximum SMT mode, wherein the maximum SMT mode is the maximum number of simultaneous threads executable by any one processor core in the set of processor cores;
    set an SMT mode for the reserved processor cores based on a first degree of parallelism determined for a first stage of the access plan;
    scheduling, based on the SMT mode, a plurality of threads for the first stage of the access plan on the reserved processor cores;
    changing, during processing of the access plan, the SMT mode in accordance with a second degree of parallelism determined for a second stage of the access plan, wherein the SMT mode is decreased in response to determining that the second degree of parallelism is less than the first degree of parallelism determined for the first stage of the access plan or increased in response to determining that the second degree of parallelism is greater than the first degree of parallelism determined for the first stage of the access plan; and
    scheduling, based on the changed SMT mode, a plurality of threads for the second stage of the access plan on the reserved processor cores.

2. The method of claim 1, wherein the access plan specifies the SMT mode on the one or more of the reserved processor cores.

3. The method of claim 1, wherein the access plan specifies a rule or formula for determining the SMT mode on the one or more of the reserved processor cores.

4. The method of claim 1, wherein changing the SMT mode on one or more of the reserved processor cores comprises changing the SMT mode by a supervisor module.

5. The method of claim 1, wherein the SMT mode includes at least a four thread mode and a single thread mode.

6. The method of claim 1, wherein the first stage comprises a scan stage and the second stage comprises a join stage.

7. A computer program product for processing data queries, the computer program product comprising:
    a computer readable storage medium having computer usable program code embodied therewith, the computer usable program code comprising a computer usable program code configured to:
        determine an access plan for a query, the access plan having a plurality of stages;
        determine a maximum degree of parallelism for the plurality of stages, wherein the maximum degree of parallelism is the highest degree of parallelism used by any one stage of the access plan;
        reserve processor cores from a set of processor cores in accordance with the maximum degree of parallelism and a maximum SMT mode, wherein the maximum SMT mode is the maximum number of simultaneous threads executable by any one processor core in the set of processor cores;
        set an SMT mode for the reserved processor cores based on a first degree of parallelism determined for a first stage of the access plan;

schedule, based on the SMT mode, a plurality of threads for the first stage of the access plan on the reserved processor cores;

change, during processing of the access plan, the SMT mode in accordance with a second degree of parallelism determined for a second stage of the access plan, wherein the SMT mode is decreased in response to determining that the second degree of parallelism is less than the first degree of parallelism determined for the first stage of the access plan or increased in response to determining that the second degree of parallelism is greater than the first degree of parallelism determined for the first stage of the access plan; and schedule, based on the changed SMT mode, a plurality of threads for the second stage of the access plan on the reserved processor cores.

8. The computer program product of claim 7, wherein the access plan specifies the SMT mode on the one or more of the reserved processor cores.

9. The computer program product of claim 7, wherein the access plan specifies a rule or formula for determining the SMT mode on the one or more of the reserved processor cores.

10. The computer program product of claim 7, wherein the computer usable program code configured to change the SMT mode on one or more of the reserved processor cores comprises computer usable program code configured to change the SMT mode by a supervisor module.

11. The computer program product of claim 7, wherein the SMT mode includes at least a four thread mode and a single thread mode.

12. An apparatus comprising:
one or more processor cores; and
a computer readable storage medium having computer usable program code for the one or more processor cores embodied therewith, the computer usable program code comprising a computer usable program code configured to:
determine an access plan for a query, the access plan having a plurality of stages;
determine a maximum degree of parallelism for the plurality of stages, wherein the maximum degree of parallelism is the highest degree of parallelism used by any one stage of the access plan;
reserve processor cores from a set of processor cores in accordance with the maximum degree of parallelism and a maximum SMT mode, wherein the maximum SMT mode is the maximum number of simultaneous threads executable by any one processor core in the set of processor cores;
set an SMT mode for the reserved processor cores based on a first degree of parallelism determined for a first stage of the access plan;
schedule, based on the SMT mode, a plurality of threads for the first stage of the access plan on the reserved processor cores;
change, during processing of the access plan, the SMT mode in accordance with a second degree of parallelism determined for a second stage of the access plan, wherein the SMT mode is decreased in response to determining that the second degree of parallelism is less than the first degree of parallelism determined for the first stage of the access plan or increased in response to determining that the second degree of parallelism is greater than the first degree of parallelism determined for the first stage of the access plan; and schedule, based on the changed SMT mode, a plurality of threads for the second stage of the access plan on the reserved processor cores.

13. The apparatus of claim 12, wherein the access plan specifies the SMT mode on the one or more of the reserved processor cores.

14. The apparatus of claim 12, wherein the access plan specifies a rule or formula for determining the SMT mode on the one or more of the reserved processor cores.

15. The apparatus of claim 12, wherein the computer usable program code configured to change the SMT mode on one or more of the reserved processor cores comprises computer usable program code configured to change the SMT mode by a supervisor module.

16. The apparatus of claim 12, wherein the SMT mode includes at least a four thread mode and a single thread mode.

17. An apparatus comprising:
one or more processor cores;
a data management system executable by the one or more processor cores and configured to receive a query;
a query optimizer for the data management system, the query optimizer executable by the one or more processor cores and configured to:
determine an access plan for the query, the access plan having a plurality of stages;
determine a maximum degree of parallelism for the plurality of stages, wherein the maximum degree of parallelism is the highest degree of parallelism used by any one stage of the access plan;
reserve processor cores from a set of processor cores in accordance with the maximum degree of parallelism and a maximum SMT mode, wherein the maximum SMT mode is the maximum number of simultaneous threads executable by any one processor core in the set of processor cores;
set an SMT mode for the reserved processor cores based on a first degree of parallelism determined for a first stage of the access plan;
schedule, based on the SMT mode, a plurality of threads for the first stage of the access plan on the reserved one or more processor cores;
change, during processing of the access plan, the SMT mode in accordance with a second degree of parallelism determined for a second stage of the access plan, wherein the SMT mode is decreased in response to determining that the second degree of parallelism is less than the first degree of parallelism determined for the first stage of the access plan or increased in response to determining that the second degree of parallelism is greater than the first degree of parallelism determined for the first stage of the access plan; and schedule, based on the changed SMT mode, a plurality of threads for the second stage of the access plan on the reserved processor cores.

18. The apparatus of claim 17, wherein the access plan specifies the SMT mode on the one or more of the reserved processor cores.

19. The apparatus of claim 7, wherein the access plan specifies a rule or formula for determining the SMT mode on the one or more of the reserved processor cores.

20. The apparatus of claim 17, and further comprising a supervisor module configured to change the SMT mode in accordance with the current second degree of parallelism determined for the second stage of the access plan.

21. The apparatus of claim 17, wherein the SMT mode includes at least a four thread mode and a single thread mode.

\* \* \* \* \*